Dec. 17, 1968   V. K. STEIDLEY   3,416,844
PICKUP PROBE
Filed Dec. 5, 1967   2 Sheets-Sheet 1

INVENTOR.
VIRGIL KENNETH STEIDLEY
BY Hamilton & Cook
ATTORNEYS

Dec. 17, 1968  V. K. STEIDLEY  3,416,844
PICKUP PROBE
Filed Dec. 5, 1967  2 Sheets-Sheet 2

INVENTOR.
VIRGIL KENNETH STEIDLEY
BY Hamilton & Cook
ATTORNEYS

United States Patent Office 3,416,844
Patented Dec. 17, 1968

3,416,844
PICKUP PROBE
Virgil Kenneth Steidley, Mansfield, Ohio, assignor to The F. E. Myers & Bro. Co., Ashland, Ohio, a corporation of Ohio
Filed Dec. 5, 1967, Ser. No. 688,187
8 Claims. (Cl. 302—58)

ABSTRACT OF THE DISCLOSURE

A pickup probe for fluidizing granular material and entraining it in a fluidizing medium. The pickup probe has an outer housing terminating, at one end, with an inserting head. An educting conduit is mounted within the housing to form a fluidizing chamber between the outer wall of the educting conduit and the inner wall of the housing. The inserting head and housing cooperate to provide a gate means for selectively controlling the rate of admission of the granular material into the fluidizing chamber. The fluidizing chamber communicates with the educting conduit so that the fluidized granular material can flow outwardly of the probe therethrough. The fluidizing chamber also communicates with inlet ports for admitting the fluidizing medium.

Background of the invention

The invention relates generally to a probe for fluidizing sand or other granular abrasives from a supply source and conveying the granular material entrained in the fluidizing medium through a hose to an eductor that also doubles as a gun for "sandblasting," or other cleaning operations.

Abrasive cleaning, or sandblasting, is the cleaning of a surface by the action of granular abrasives propelled by compressed air, or other fluid, through a nozzle. The granular abrasive is supplied in bags of convenient size for handling by a man, and, with prior cleaning apparatus, this material had to be deposited in special hoppers. The prior known hoppers meter the sand, by gravity, through a complex regulating device into a hose which connects with, and provides compressed air to, the cleaning nozzle. However, in order that the line pressure in the hose will not blow out through the hopper it is necessary that the hoppers themselves be tightly sealed and pressurized. As such, they are quite complicated and expensive, not only to manufacture but also to maintain.

In addition, when an operator using these prior art hoppers desires to change the grade, or size, of the granular abrasive he must either have multiple hoppers available, or, if only one hopper is used, that one must be completely emptied and refilled with the appropriate abrasive.

Summary of the invention

It is therefore a primary object of the present invention to provide a probe which will pick up the abrasive cleaning material without the necessity of an enclosed, or pressurized, hopper.

It is another object of the present invention to provide a probe, as above, which will pick up the abrasive material directly out of the supply bag, if desired.

It is still another object of the present invention to provide a probe, as above, which fluidizes the abrasive material for transmission to the cleaning gun entrained in the fluidizing medium.

It is a further object of the present invention to provide a probe, as above, which has gate means for controlling the admission of abrasive material.

It is a still further object of the present invention to provide a probe, as above, which is not only compact and readily portable but also inexpensive to manufacture and maintain.

These and other objects which will become apparent from the following specification are accomplished by means hereinafter described and claimed.

In general, a pickup probe according to the concept of the present invention has an outer housing within which is an educting conduit. The outer surface of the educting conduit is sealed to one end of the housing, and the interior of the educting conduit is connected to a remote eductor gun, or other means for reducing the pressure within the educting conduit. The opposite end of the housing carries an inserting head which cooperates with the housing to provide gate means for controlling the admission of the abrasive material into a fluidizing chamber formed between the educting conduit and the housing. This fluidizing chamber communicates with inlet ports in the housing for admission of a fluidizing medium and also communicates with the interior of the educting conduit so that the fluidized granular material can flow outwardly therethrough entrained in the fluidizing medium.

A preferred embodiment of the present invention is shown by way of example in the accompanying drawings and hereinafter described in detail without attempting to show all of the various forms and modifications in which the invention might be embodied; the invention being measured by the appended claims and not by the details of the specification.

Description of the preferred embodiment

Figure 1:
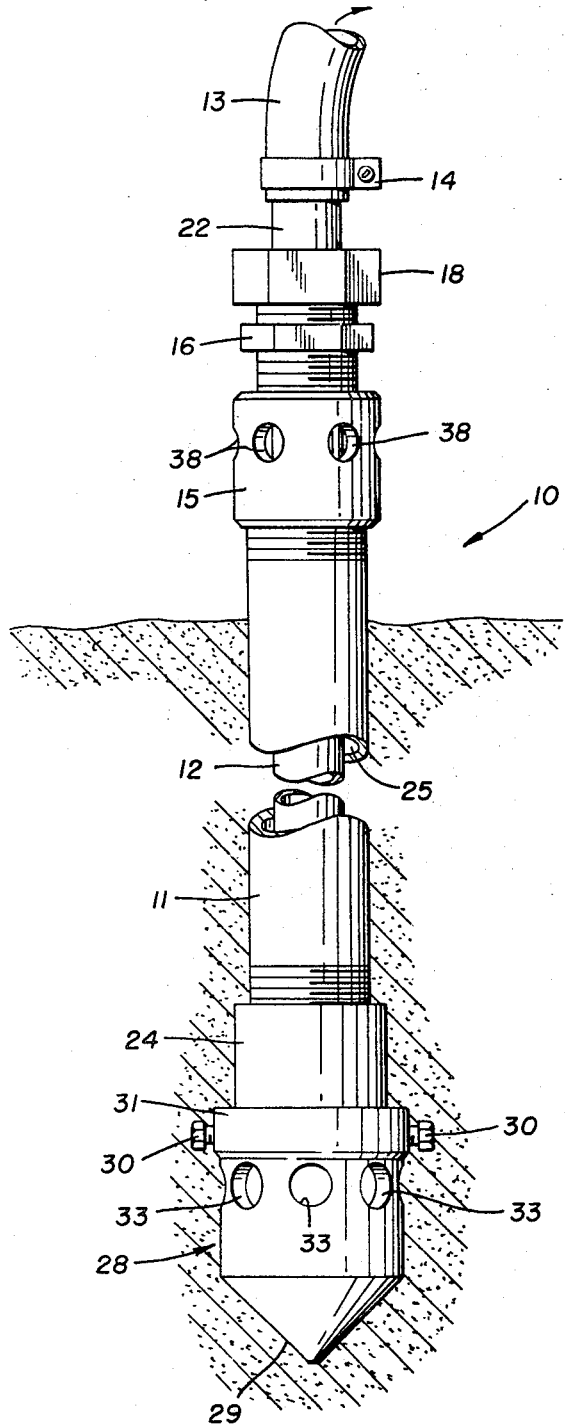
FIG. 1 is an elevation, partly broken away, of a pickup probe embodying the concept of the present invention.
Figure 2:
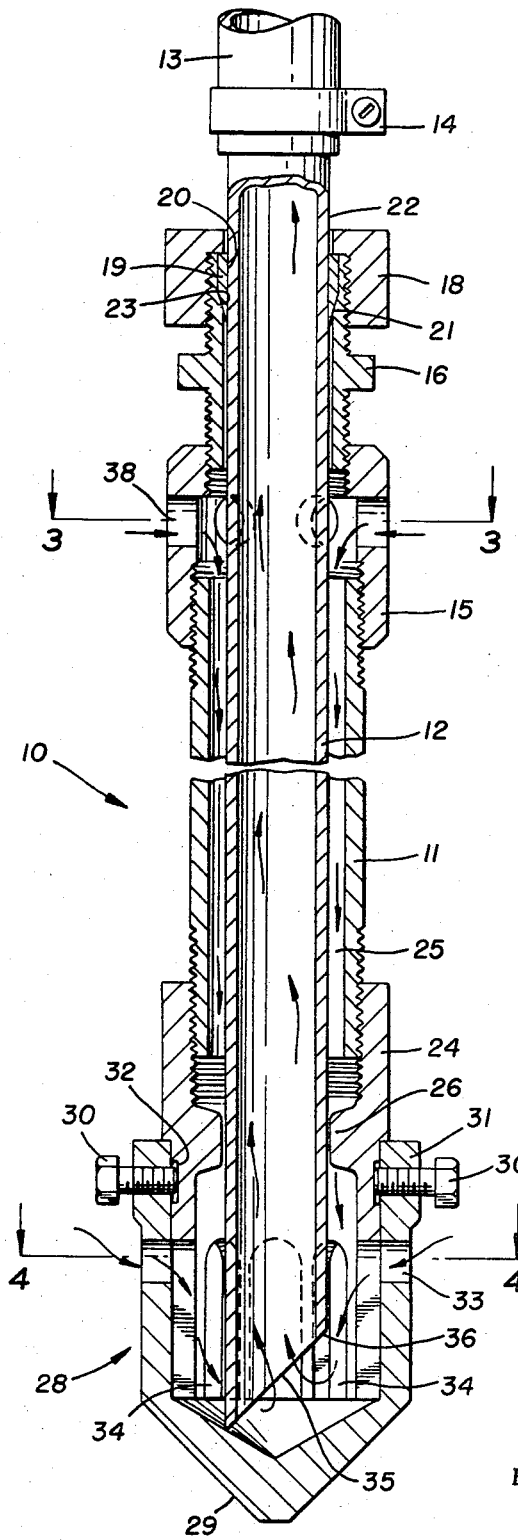
FIG. 2 is an enlarged longitudinal section of the pickup probe depicted in FIG. 1.

A pickup probe embodying the concept of the present invention is designated generally by the numeral 10 in FIGS. 1 and 2. The probe 10 has an outer, hollow, elongated housing 11 which is conveniently cylindrical. Extending axially outwardly from within the hollow housing 11 is an eductor conduit 12, the outer end of which is attached to a hose 13, as by a standard hose clamp 14. That end of the housing 11 proximal the connection of the hose 13 to the eductor conduit 12 is externally threaded to receive a coupling 15. A sleeve fitting 16 slidably engages the eductor conduit 12 and one end thereof is threaded into the coupling 15. The other end of the sleeve fitting 16 is threaded to receive a stuffing nut 18 which forces an annular compression gland 19 with a cylindrical inner surface 20 and a conical outer surface 21 into frictional engagement between the outer cylindrical surface 22 of the eductor conduit 12 and the inner conically tapered surface 23 on the sleeve fitting 16. The compression gland 19 thus fixes the position of the eductor conduit 12 within the housing 11.

Figure 3:
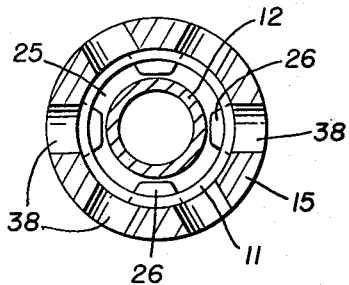
FIG. 3 is a cross sectional view taken substantially on line 3—3 of FIG. 2; and, FIG. 4 is a cross section taken substantially on line 4—4 of FIG. 2.
Figure 4:
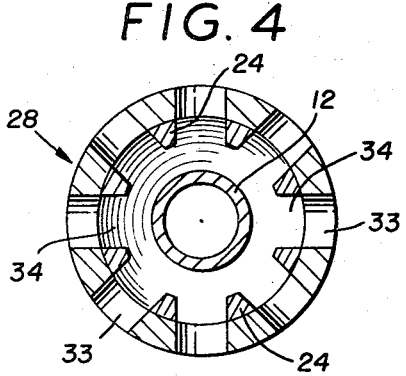

The end of the housing 11 distal from the connection of the hose 13 to the eductor conduit 12 is also externally threaded to receive a combined position and gate sleeve 24 and thus forms a distal extension of the housing. With the outer dimension of the eductor conduit 12 being of lesser dimension than the inner dimension of the housing 11, a fluidizing chamber 25 is formed therebetween. The positioning function of the sleeve 24 is accomplished by three or more radially inwardly directed stabilizing lugs 26 which maintain the eductor conduit 12 spaced radially inwardly of the housing 11, fixedly to define the fluidizing chamber 25 (FIG. 3).

Slidably engaging the cylindrical outer surface of the sleeve 24 is an inserting head 28. The tip portion 29 of the head 28 is preferably tapered, as shown, for ease of insertion into the supply source of the abrasive granular material to be picked up by the probe. A radially directed set screw 30 extends through the skirt portion 31 of the inserting head 28 and into a peripheral groove 32 on the radially outer surface of the sleeve 24.

A plurality of radially directed, circumferentially spaced ports 33 extend through the skirt portion 31 of the head 28. A plurality of circumferentially spaced, axial slots, or other openings, 34 in the sleeve 24 cooperate, on rotational positioning of the head 28 with respect to the sleeve 24, to form gate means by which admission of the granular abrasive into the fluidizing chamber 25 is selectively controlled. Although both the ports 33 and the openings 34 may be radially oriented bores, it is preferable that the openings be slots extending longitudinally along the sleeve 24 to minimize any tendency of the granular material to bridge across the ports and openings and thereby block the gate means. Additionally, the ports 33 may be inclined inwardly and distally further to assist the admission of the granular material into the chamber 25.

As best seen in FIG. 2, the distal end of the eductor conduit 12 is angularly truncated to form an entrance passage 35. The degree of angular truncation is not itself critical, however, the proximal reach 36 of the entrance passage 35 must sufficiently approach the gate means to facilitate the entry of material from the fluidizing chamber 25 into the eductor conduit 12 even after the application of negative pressure has been interrupted, as will be more fully hereinafter described.

In use, the hose 13 is connected to an eductor, or other means not shown, for producing a negative pressure within the eductor conduit 12. A plurality of inlet ports 38 in the coupling 15 permit air to be drawn into the fluidizing chamber 25, pass through the entrance passage 35 and flow along the eductor conduit itself in response to the application of negative pressure to the probe 10 by hose 13. With the probe fully exposed to atmosphere air can also be drawn into the fluidizing chamber 25 through the ports 33 in head 28 and past the slots 34 in sleeve 24.

In order to pick up an abrasive the head 28 and housing 11 are inserted into a source of granular abrasive material—the probe can even be inserted into the bag in which the abrasive material is packaged. The inlet ports 38 in coupling 15 should remain exposed to atmosphere and, in any event, should not prohibit the admission of air into the fluidizing chamber 25. By adjusting the relative position of the ports 33 rotationally with respect to the slots 34 the gate so formed permits a controlled flow rate of the granular abrasive into the fluidizing chamber 25. Many factors, including the size of the granules and their moisture content, contribute to the gate setting required for a particular job, but one experienced in the art of abrasive cleaning will soon be able to adjust the proper gate setting. In any event, this setting is easily adjusted by loosening nut screw 30 and rotating the head 28 to secure the desired gate opening by control of the registry of the ports 33 with the slots 34 and then re-tightening the set screw 30 so that the desired solids-to-air ratio is obtained.

The granular material which thus pours into the chamber 25 is separated particle from particle and entrained within the air flowing through the probe along the previously described course—i.e., the granular abrasive is fluidized. As such, the granules flow past the entrance passage 35, into the eductor conduit 12 and through the hose 13 to the remote source of negative pressure. The granular material will continue to be picked up in this manner by the probe until either the material is expended or the application of negative air pressure is terminated.

One of the primary advantages of this structure is that upon cessation of the negative air pressure, the probe will not clog. Because of the configuration heretofore described, only a limited amount of the granular material will enter the chamber 25 after cessation of the negative air pressure. If the probe is substantially vertically disposed within the source of the abrasive material, the upper surface of the material within the chamber 25 could only rise substantially to the upper level of the ports 33 and/or slots 34. Even if the probe 10 is inclined toward the horizontal the material will in no event extend upwardly of the gate formed by the ports 33 and slots 34 more than allowed by its angle of repose. As such, with the reach 36 of the entrance passage 35 into the eductor conduit 12 extending longitudinally of the conduit 12 to lie in proximity to the longitudinal position of the gate means the accumulation of granular material within the chamber 25, will, in any event, be insufficient to block the passage of air entering chamber 25 from entering the conduit 12 upon the resumed application of negative pressure to eductor conduit 12. This air, or fluid, flow will immediately refluidize the granules in chamber 25 and flow of the granular abrasive material will commence without difficulty.

It should now be apparent that a probe constructed in accordance with the concept of the present invention provides an uncomplicated and inexpensive fluidizing pickup for granular material from even an open supply source and otherwise accomplishes the objects of the invention.

I claim:

1. Apparatus for pickup of granular material from a supply source for delivery to a remote location comprising, elongated, hollow housing means having one end adapted for insertion into a supply source of granular material, an eductor conduit received within said housing member, a chamber between said housing and said eductor conduit, said chamber communicating with a fluid source through inlet means, said chamber also communicating with said eductor conduit through an entrance passage, gate means through said housing means for admission of the granular material to said chamber, said gate means located between the inlet means for the fluid to said chamber and the entrance passage by which said chamber communicates with said eductor conduit and in proximity to said entrance passage.

2. Apparatus, as set forth in claim 1, in which the chamber extends longitudinally of said apparatus and in which the entrance passage is spaced longitudinally of said inlet means, said gate means being located in proximity to said entrance passage longitudinally between said inlet means and entrance passage.

3. Apparatus, as set forth in claim 1, wherein said gate means comprises openings in one portion of said housing means and ports in a second portion of said housing means, said ports and openings being variably registrable by movement of one portion of said housing means with respect to the other.

4. Apparatus, as set forth in claim 1, wherein the end of said housing means adapted for insertion in a supply source is an insertion head having a tip portion and a skirt portion, the skirt portion slidably engaging a portion of the remainder of said housing means for movement relative thereto, said skirt having ports therethrough variably registrable with openings in said housing means upon relative movement between said insertion head and the remainder of said housing means to form said gate means.

5. Apparatus, as set forth in claim 4, in which said eductor conduit extends outwardly of said housing means for connection to a source of negative pressure, the fluid inlet means to said chamber being proximal of said connection.

6. Apparatus, as set forth in claim 5, in which the end of said eductor conduit distal from the connection of said source of negative pressure thereto terminates in an entrance passage in proximity to and distal of said gate means.

7. Apparatus, as set forth in claim 6, in which the eductor conduit is cylindrical and the distal end is truncated with the reach of the entrance passage provided thereby being proximal said gate means.

8. Apparatus for pickup and delivery of abrasive material from a supply source to a remote location comprising, an elongated, hollow housing member having a closed end adapted for insertion into a supply source, a cylindrical eductor conduit coaxially contained within said housing member, the space between said housing and said eductor conduit defining a fluidizing chamber, the interior of said eductor conduit adapted for the passage of fluid and entrained particles of abrasive material, means for drawing fluid into said fluidizing chamber, ports adjacent the closed end of said housing exposing said fluidizing chamber to particles of abrasive material, the interior of said eductor conduit communicating with said fluidizing chamber between said ports and the closed end of said housing.

References Cited

UNITED STATES PATENTS

| 268,303 | 11/1882 | Smith | 302—58 |
| 1,412,977 | 4/1922 | Strong | 302—58 |
| 3,153,344 | 10/1964 | Lawrence et al. | 302—58 |

ANDRES H. NIELSEN *Primary Examiner.*